United States Patent [19]
Bowman et al.

[11] Patent Number: 4,590,592
[45] Date of Patent: May 20, 1986

[54] DISPLAY OF RESPONSE CHARACTERISTICS OF SEISMIC SOURCE ARRAYS

[75] Inventors: Bonita F. Bowman, Arlington; Keh Pann, Richardson; Maynard S. Redeker, Dallas, all of Tex.

[73] Assignee: Mobil Oil Corporation, New York, N.Y.

[21] Appl. No.: 580,928

[22] Filed: Feb. 16, 1984

[51] Int. Cl.$^4$ .......................... G01V 1/38; G01V 1/34
[52] U.S. Cl. ........................................ 367/68; 367/70; 367/72; 367/23; 343/7.9
[58] Field of Search ...................... 367/68, 110, 70, 72, 367/23, 47, 53, 21, 9; 358/3; 343/7.9, 5 CD; 346/46

[56] References Cited

U.S. PATENT DOCUMENTS

| | | | |
|---|---|---|---|
| 3,406,777 | 10/1968 | Bemrose | 367/23 |
| 3,961,306 | 6/1976 | Austey | 343/5 CD |
| 4,279,026 | 7/1981 | Lambright et al. | 367/70 |
| 4,357,689 | 11/1982 | Ruehle | 367/23 |
| 4,443,797 | 4/1984 | Cramp et al. | 343/5 CD |
| 4,476,550 | 10/1984 | Ziolkowski et al. | 367/21 |

FOREIGN PATENT DOCUMENTS

54809 10/1974 Australia ............................... 367/70

Primary Examiner—Nelson Moskowitz
Assistant Examiner—Ian J. Lobo
Attorney, Agent, or Firm—Alexander J. McKillop; Michael G. Gilman; Charles J. Speciale

[57] ABSTRACT

In seismic exploration, the response characteristics of an array of seismic sources is displayed by contours of equal values of amplitude response as a function of azimuth and dip angle in a stereoscopic polar projection. The projection includes a center point on an axis extending away from the center point representing amplitude response at locations on the line of exploration. Points disposed circumferentially about said axis amplitude response at different azimuth angles from the line of exploration and points at different radial distances from the center point represent amplitude response at different dip angles.

8 Claims, 13 Drawing Figures

TOTAL TRAVELTIME = (AB + BC)/V

FIG. 3
SWAG SOURCE (42 GUNS)

FIG. 2
POINT SOURCE (42 GUNS)

FIG. 4

ANGULAR COORDINATE SYSTEM
FIG. 5

DISPLAY OF RESPONSE CHARACTERISTICS OF SEISMIC SOURCE ARRAYS

BACKGROUND OF THE INVENTION

This invention relates to the display of the response characteristics of an array of seismic sources, and more particularly to an improved display of the response characteristics as a function of the azimuth and depth relative to the array.

In seismic exploration, an array of seismic sources is moved along a line of exploration on the earth's surface. The reflections and/or refractions of seismic energy from the sources are recorded as seismograms. Complex source and receiver arrays have been successfully used to suppress noise and emphasize reflections or refractions from particular areas of interest. Seismic energy from an array of sources adds cumulatively, or the energy is cancelled, at particular points relative to the array. By appropriate selection of the number of sources in the array, the spacing of the sources, and the timing of firing, improved seismograms can be obtained. Particularly in marine seismic exploration, the presence of a homogeneous near surface water layer, combined with potential scatterers, such as channels, faults, salt domes, drilling rigs, and so on, on or near the water bottom, favors the use of an array having a relatively unattenuated propagation of energy which is off the line of exploration.

In an attempt to use the best possible array of sources in gathering seismograms, a great deal of study has been directed to the response characteristics of seismic arrays. See "Toward an Understanding and Suppression of Coherent Noise in Marine Seismic Data," by K. Larner, R. Chambers, M. Yung, W. Lynn, and W. Wai, Paper presented at the 51th Annual International SEG Meeting, Nov. 9-11, 1981, Los Angeles; and "Electroacoustic Characteristics of Marine Seismic Streamers, by J. W. Bedenbender, R. C. Johnston, and E. B. Neitzel, GEOPHYSICS, Vol. 35, p. 1054–1072, 1970.

The response characteristics of an array of sources can be physically measured, or they can be determined from the characteristics of the array itself. Physical measurement of the response characteristics requires taking the array to very deep water where there will be no obscuring reflections and measuring the amplitude of the seismic energy at various locations differing in azimuth and dip. Because this is a laborious procedure, the response characteristics of an array are more often determined from the physical parameters of the array itself. The response of an acoustic array is related to its parameters, and to the azimuth $\phi$ and to the dip $\theta$ by the following:

$$A(\theta,\phi) = \sum_{j=1}^{N} A_j \exp(2\pi i f/v \cos\theta(X_j \cos\phi + Y_j \sin\phi))$$

where:
Aj=strength of jth point source element
(xj, yj)=location of jth point source element
N=number of point source elements in the areal array
f=frequency of consideration
v=near surface Seismic Velocity In order to provide a display of the response characteristics of an array of sources, the prior art usually finds the Fourier transform of the amplitude response in one or two dimensions. The amplitude response may be displayed in the wave number domain, $k_x$ vs. $k_y$, with contours of amplitude, sometimes expressed in decibels. Alternatively, the displays are made in direction for one frequency so that traditional one dimensional plots can be made.

The first mentioned display contains all of the required information, but it is in a form which cannot be immediately used. The second mentioned method requires the production of many plots and these are difficult to evaluate quickly.

It is an object of the present invention to provide a display of the amplitude characteristics of an array of seismic sources in a form which can be readily interpreted.

It is a further object of the present invention to provide a display of the response characteristics of an array of seismic sources in a form which can be quickly used by a geophysicist to select the proper source array for exploration of a given area of interest.

SUMMARY OF THE INVENTION

In accordance with the present invention, contours of equal value of amplitude response at a plurality of locations are plotted as a function of the azimuth and dip angle of the locations in a stereoscopic polar projection.

More particularly, the projection includes a center point and an axis extending away from the center point representing amplitude response at locations on the line of exploration. Points disposed circumferentially about the axis represent the amplitude response at different azimuth angles from the line of exploration and points at different radial distances from the center point represent amplitude response at different dip angles.

Further in accordance with the present invention, areas on the projection which represent equal values of amplitude response have the same color with different colors representing different values of equal amplitude response.

The display of amplitude response in accordance with the present invention provides an important tool which can be used in seismic exploration to select an array having an amplitude response which is best suited for the area to be explored.

The foregoing and other objects, features and advantages of the invention will be better understood from the following more detailed description and appended claims.

DESCRIPTION OF THE PREFERRED EMBODIMENT

Figure 1:
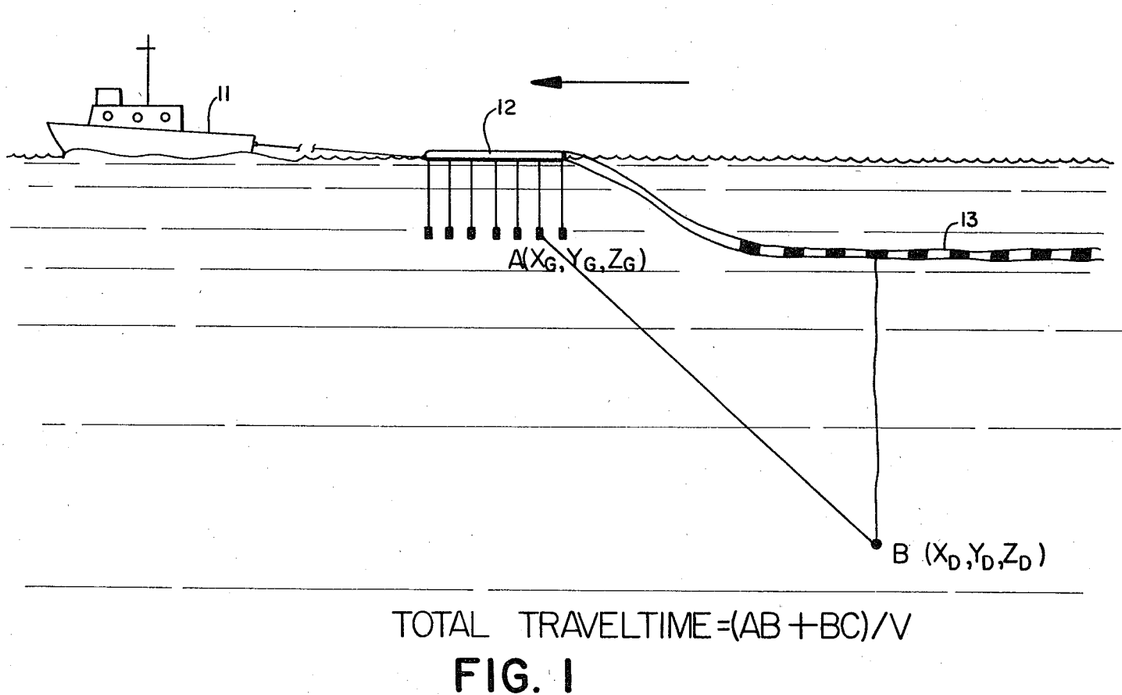
FIG. 1 depicts a source array and a receiver array being towed behind an exploration vessel in marine seismic exploration.

FIG. 1 depicts a marine exploration vessel 11 towing an array of seismic sources 12 and an array of geophones 13 along a line of exploration. Reflections and/or refractions of seismic energy from the sources 12 are received by the receiver array 13 and recorded as seismograms.

Figure 2:
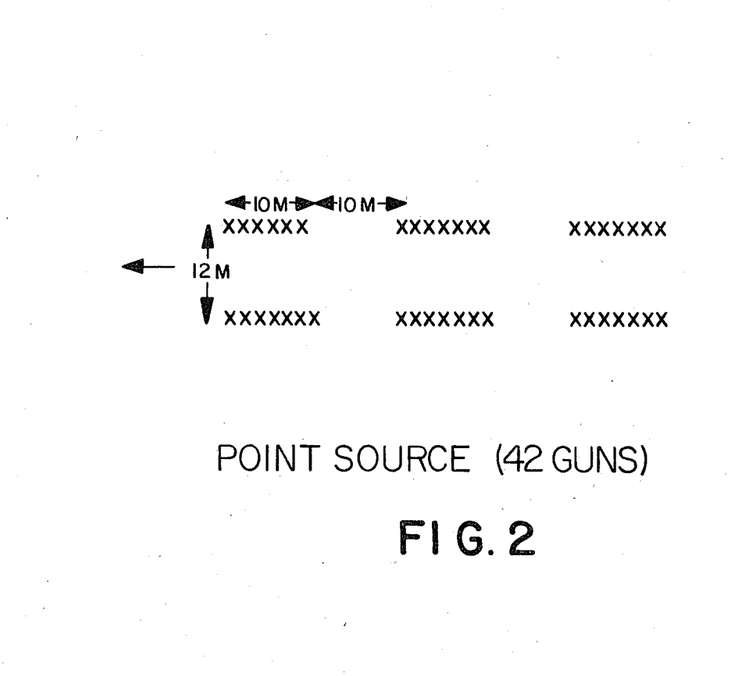
FIG. 2 depicts the configuration of a 42-gun point source.
Figure 3:
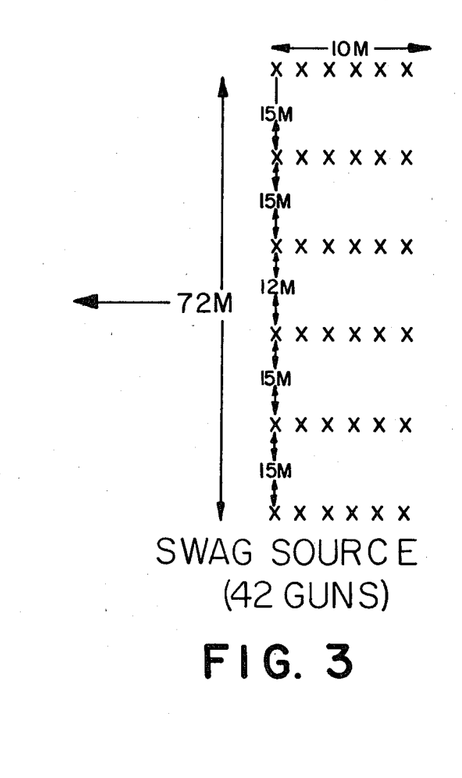
FIG. 3 depicts a 42-gun array commonly referred to as a "SWAG" array.
Figure 4:
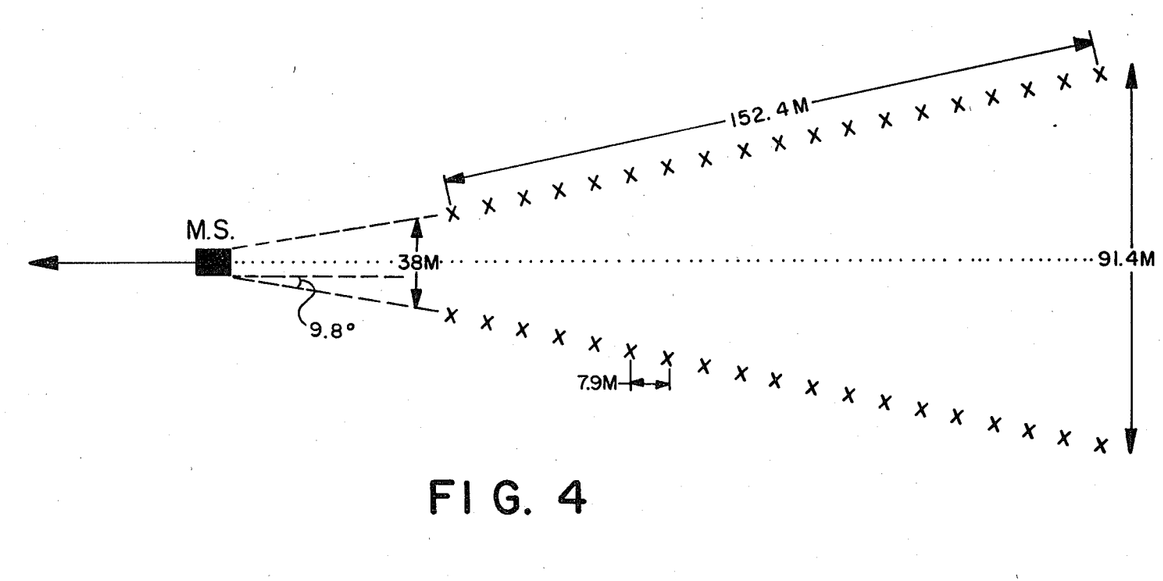
FIG. 4 is a long source array.

FIG. 2 is a plan view of the 42 air guns in an array which is typically fired in a sequence to produce a point source. FIG. 3 is a plan view of the air guns in an array typically used to retrieve seismic data from a wide angle of exploration interest. FIG. 4 is a plan view of 40 air guns arrayed as a long source which produces seismic energy in a pattern which can be steered depending on the sequence of firing. Each of the arrays of FIGS. 2-4 has a different amplitude response which makes it more or less suitable for seismic exploration in particular areas. There are many other known arrays of sources which can be used in geophysical exploration.

Figure 5:
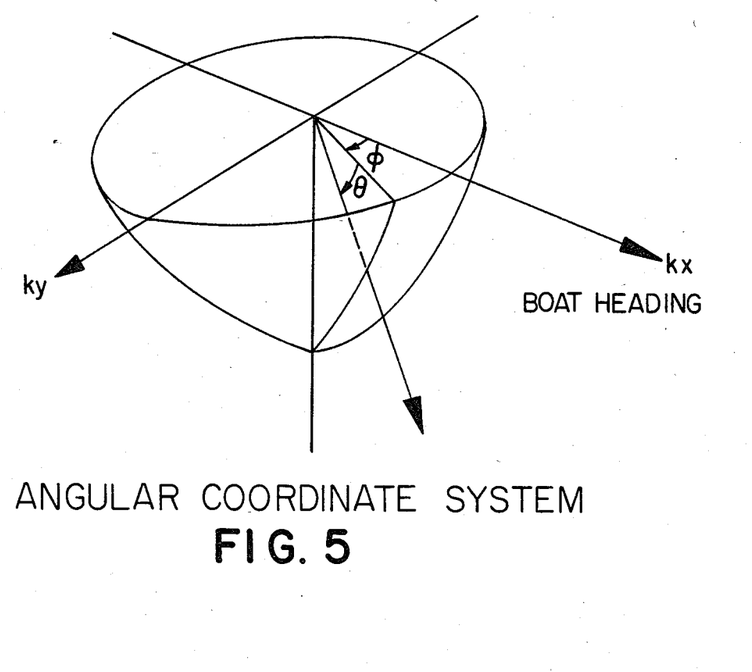
FIG. 5 shows the angle coordinate system which is used.

In order to evaluate the relative merits of these arrays for exploration in a particular location, the amplitude response of the array is determined at a plurality of locations at azimuth angles and different dip angles from the array. FIG. 5 shows the angular coordinate system wherein the azimuth angle $\phi$ and the dip angle $\theta$ are specified. While the amplitude response may be determined by physical measurement, as previously mentioned, the amplitude response is more often determined from the characteristics of the array itself in accordance with:

$$A(\phi,\theta) = \sum_{j=1}^{N} A_j \exp(2\pi i f/v \cos\theta(X_j \cos\phi + Y_j \sin\phi))$$

where:
Aj=strength of jth point source element
(xj, yj)=location of jth point source element
N=number of point source elements in the areal array
f=frequency under consideration
v=near surface velocity From the foregoing, amplitude response at a plurality of locations as a percentage of maximum amplitude is determined.

From this determination, equal values of amplitude response are selected. These are displayed as contours of equal values of amplitude response as a function of azimuth and dip angle in a stereoscopic polar projection of the type shown in FIGS. 7-13.

Figure 7:
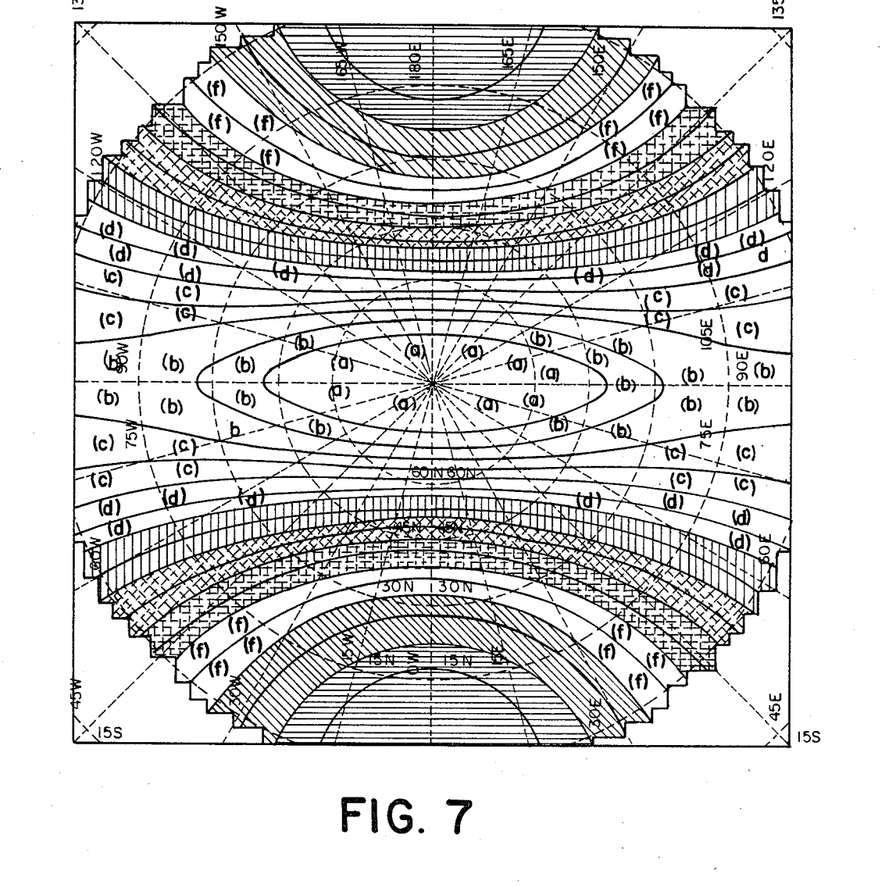
FIG. 7 shows a display in accordance with the present invention of the response characteristics of the array shown in FIG. 2 at 25 Hz.

Referring particularly to FIG. 7, each projection includes a center point 14. An axis 15 extends away from the center point. Points on the axis represent amplitude response at locations on the line of exploration, but at different dip angles. Points disposed circumferentially about the axis represent amplitude response at different azimuth angles from the line of exploration. For example, in FIG. 7, the axis 14 represents an azimuth of 180° E., the heading of the line of exploration. Points on the line 16 represent amplitude response at 165° W., points on the line 17 represent amplitude response at 150° W., and so on. Points at different radial distances from the center point 14 represent amplitude response at different dip angles. For example, all points at the radial distance defined by the line 19 represent amplitude response at a dip angle of 0, i.e., the surface; points at the radial distance represented by the line 21 represent amplitude response at a dip angle of 15° below the surface; points on the line 21 represent amplitude response at a dip angle of 30° below the surface, and so on.

Figure 6:
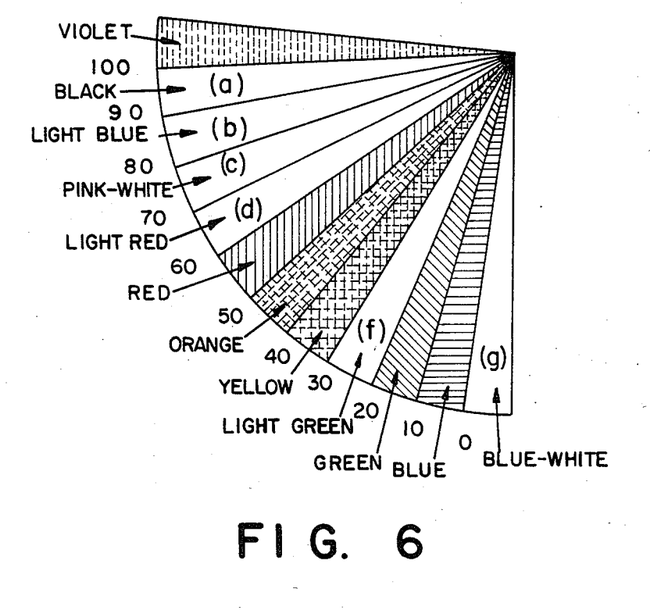
FIG. 6 shows the color calibration of the stereographic projections of the present invention.

Areas on the display which represent equal values of amplitude response have the same color with different colors representing different values of equal amplitude response. FIG. 6 is a color calibration which has been used to produce the displays shown in the Appendix. The displays in the Appendix are colored reproductions of the displays depicted in FIGS. 7-13.

Figure 8:
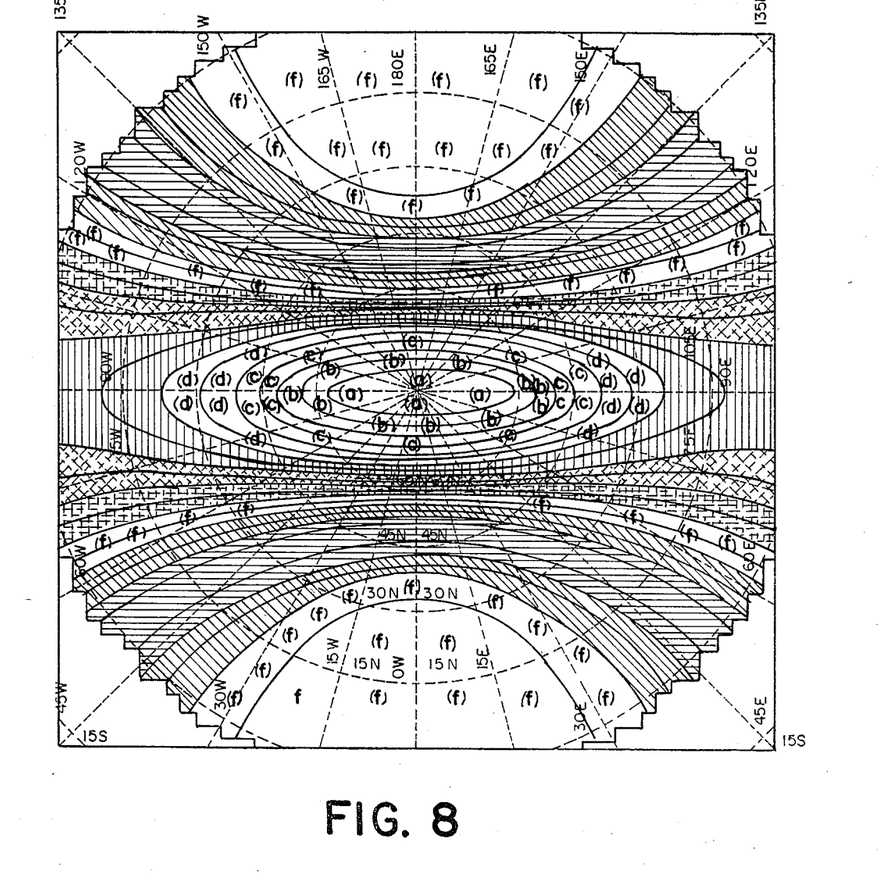
FIG. 8 shows a display in accordance with the present invention of the response characteristics of the array shown in FIG. 2 at 40 Hz.
Figure 9:
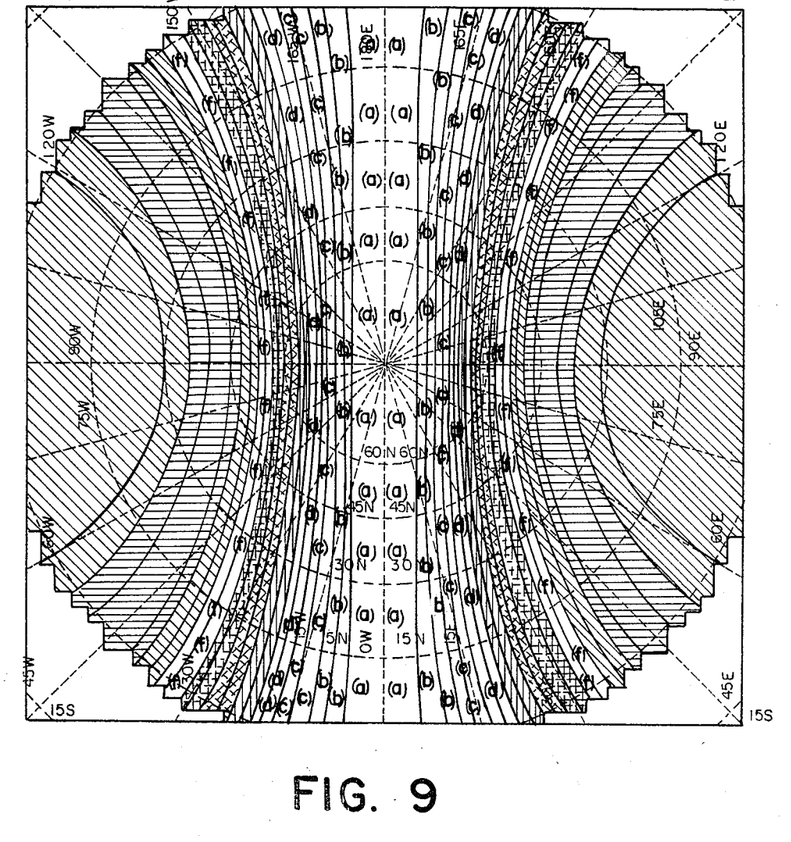
FIG. 9 shows a display in accordance with the present invention of the amplitude response characteristics of an array of the type shown in FIG. 3 at 25 Hz.
Figure 10:
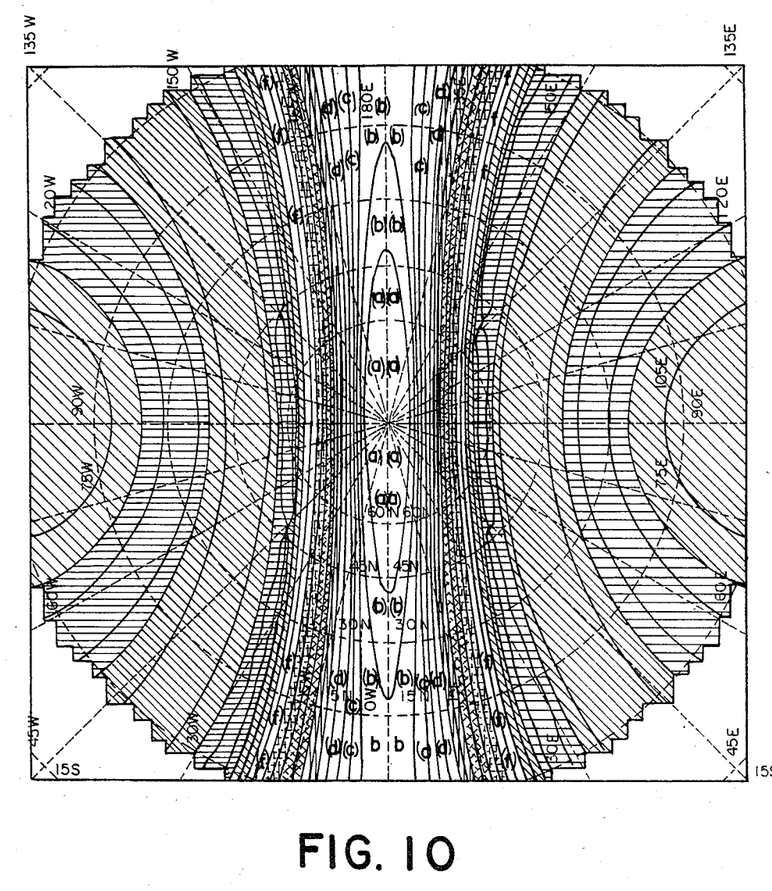
FIG. 10 shows a display in accordance with the present invention of the amplitude response characteristics of an array of the type shown in FIG. 3 at 40 Hz.
Figure 11:
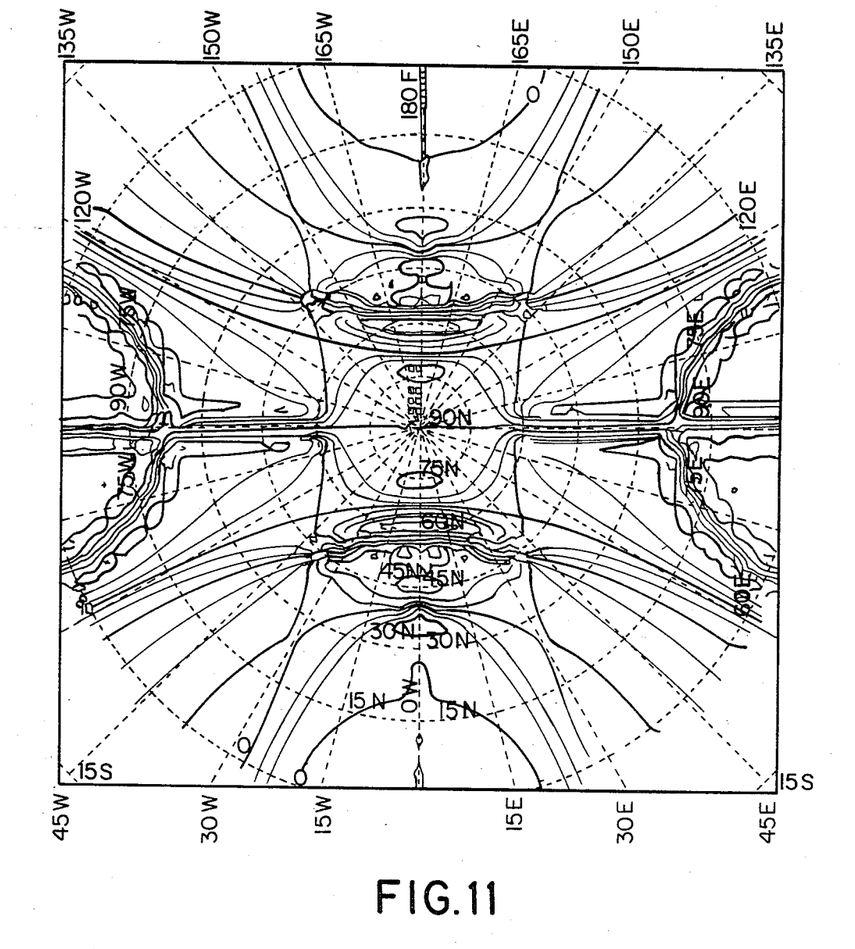
FIG. 11 is an overlay for FIGS. 12 and 13.
Figure 12:
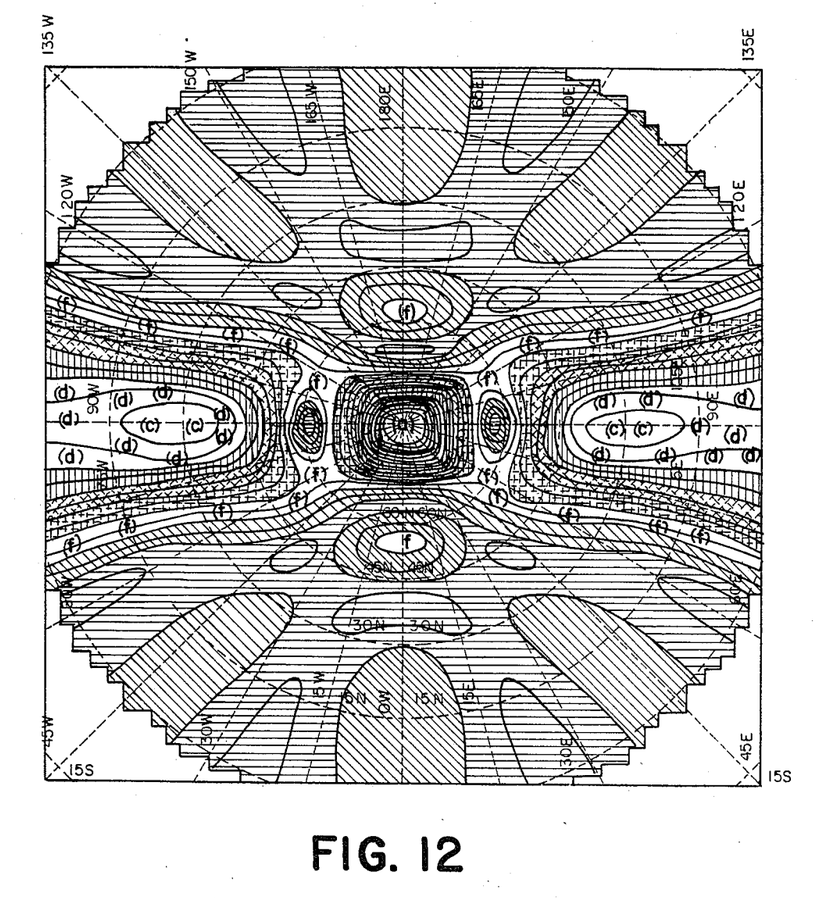
FIG. 12 is a display in accordance with the present invention of the amplitude response characteristics of an array of the type depicted in FIG. 3 at 25 Hz.
Figure 13:
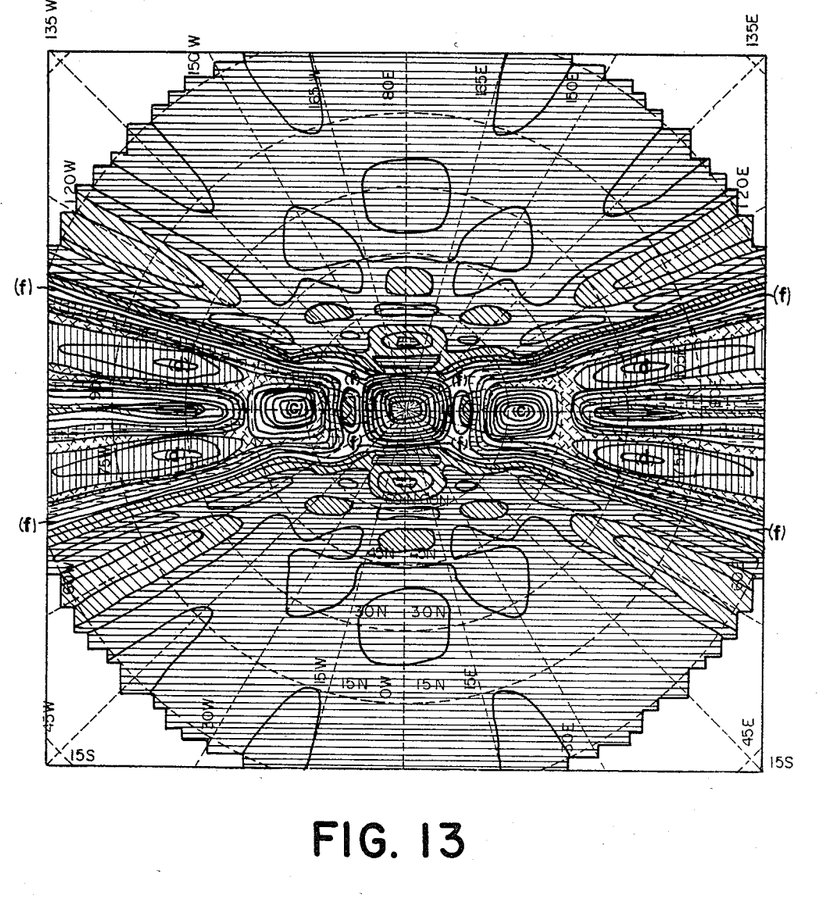
FIG. 13 is a display in accordance with the present invention of the amplitude response characteristics of an array of the type depicted in FIG. 3 at 40 Hz.

FIG. 8 is similar to FIG. 7 but shows the display of amplitude response at a frequency of 40 Hz. FIGS. 7 and 8 depict the amplitude response of a point source of the type shown in FIG. 2. FIGS. 9 and 10 display the amplitude response of a source of the type shown in FIG. 3 and FIGS. 11-13 depict the amplitude response of a source array of the type shown in FIG. 4.

The 42 gun point source responses shown in FIGS. 7 and 8 indicate that very little attenuation occurs for energy traveling across the line within 15° of perpendicular to the line of exploration. This is most pronounced for the low frequencies (FIG. 7).

Results are essentially reversed for the arrays of FIGS. 3 and 4. FIGS. 9-13 indicate very little attenuation within 15° of the in-line direction. The additional length of the long source of FIG. 4 improves its response over that of the FIG. 3 source in this regard; however, the poorer sampling in the cross-line direction has resulted in less attenuation in this direction as evidenced by the relatively large side lobes.

The amplitude response of the long source, FIGS. 10-13, shows a significant improvement in the low frequency response as the attenuation is considerably more iso-directional. For higher frequencies, attenuation characteristics are quite severe for $\theta$ less than 75°. As a consequence, the source geometry may also discriminate against in-line dip as well; a response which may be undesirable for some geologic exploration objectives.

From the foregoing, it can be seen that the stereoscopic polar projection of the present invention provides a particularly desirable tool for evaluating the characteristics of seismic source arrays. Projections of the type shown in the Appendix may be graphically plotted for use in exploration. Alternatively, the projections may be displayed on a CRT for real time study and use during exploration.

While a particular embodiment of the invention has been shown and described, various modifications are within the true spirit and scope of the invention. The appended claims are, therefore, intended to cover all such modifications.

What is claimed is:

1. In seismic exploration wherein an array of seismic sources is moved along a line of exploration on the earth's surface and the reflections and/or refractions of seismic energy from said sources are recorded as seismograms, the method of displaying the response characteristics of said array comprising:

determining the amplitude response of said array at a plurality of locations at different azimuth angles and at different dip angles from said array;

selecting equal values of determined amplitude response; and displaying contours of said equal values of amplitude response as a function of azimuth and dip angle in a stereoscopic polar projection.

2. The method recited in claim 1 wherein said projection includes a center point on an axis extending away from said center point representing amplitude response at locations on said line of exploration, points disposed circumferentially about said axis representing amplitude response at different azimuth angles from said line of exploration and points at different radial distances from said center point representing amplitude response at different dip angles.

3. The method recited in claim 1 wherein areas on said projection which represent equal values of amplitude response have the same color with different colors representing different values of equal amplitude response.

4. The method recited in claim 1 wherein said projection is graphically plotted.

5. The method recited in claim 1 wherein said projection is displayed on a CRT.

6. The method recited in claim 1 further comprising: producing one polar projection for each of a plurality of frequencies of interest.

7. The method recited in claim 1 wherein the amplitude response characteristics of said array is the percentage of the maximum amplitude produced by said seismic sources for each of said plurality of locations.

8. The method recited in claim 1 wherein the amplitude response of said array is determined by:

$$A(\phi,\theta) = \sum_{j=1}^{N} A_j \exp(2\pi i f/v \cos\theta(X_j \cos\phi + Y_j \sin\phi))$$

where
$A_j$ = strength of jth point source element
$(X_j, Y_j)$ = location of jth point source element
$N$ = number of point source elements in the areal array
$f$ = frequency under consideration
$v$ = near surface seismic velocity
$\theta$ = dip angle
$\phi$ = azimuth angle.

* * * * *